(12) United States Patent
Knoll et al.

(10) Patent No.: US 6,521,712 B1
(45) Date of Patent: *Feb. 18, 2003

(54) GLASS-CLEAR IMPACT-MODIFIED POLYSTYRENE BASED ON STYRENE-BUTADIENE BLOCK COPOLYMERS

(75) Inventors: Konrad Knoll, Ludwigshafen (DE); Herrmann Gausepohl, Mutterstadt (DE); Wolfgang Fischer, Walldorf (DE); Josef Wünsch, Schifferstadt (DE); Paul Naegele, Otterstadt (DE); Jürgen Koch, Kapellen (BE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/471,288

(22) Filed: Dec. 23, 1999

(30) Foreign Application Priority Data

Mar. 27, 1999 (DE) .......................... 199 14 075

(51) Int. Cl.$^7$ ....................... C08F 293/00; C08F 297/00
(52) U.S. Cl. ......................... 525/314; 525/315; 525/316
(58) Field of Search ................. 525/314, 315, 525/316

(56) References Cited

U.S. PATENT DOCUMENTS

| 3,632,682 | A |   | 1/1972  | Darcy |         |
|-----------|---|---|---------|-------|---------|
| 3,767,632 | A |   | 10/1973 | Halasa |        |
| 3,872,177 | A |   | 3/1975  | Halasa |        |
| 3,944,528 | A |   | 3/1976  | Loveless |      |
| 4,603,155 | A |   | 7/1986  | Muramori et al. | 525/314 |
| 4,939,208 | A |   | 7/1990  | Lanza et al. | 525/93 |
| 6,197,889 | B1 | * | 3/2001 | Knoll et al. | 525/314 |

FOREIGN PATENT DOCUMENTS

| DE | 19715035 | 10/1998 |
| EP | 654 488  | 5/1995  |
| EP | 842962   | 5/1998  |
| GB | 1556234  | 11/1979 |

OTHER PUBLICATIONS

Smith et al., *Polymer Preprints,* 34(2), p. 672–673, 1993.

Smith et al., *Polymer Preprint,* 35(2), p. 466–467, 1994.

C.W. Wofford et al., *J. Polym. Sci: Part A–1* vol. 7, p. 461–469, 1969.

* cited by examiner

*Primary Examiner*—Jeffrey Mullis
(74) *Attorney, Agent, or Firm*—Keil & Weinkauf

(57) ABSTRACT

Block copolymers comprise at least two hard blocks $S_1$ and $S_2$ made from vinyl aromatic monomers and, between these, at least ore random soft block B/S made from vinyl aromatic monomers and from dienes, where the proportion of the hard blocks is above 40% by weight, based on the total block copolymer, wherein the 1,2-vinyl content in the soft block B/S is less than 20%.

13 Claims, No Drawings

GLASS-CLEAR IMPACT-MODIFIED POLYSTYRENE BASED ON STYRENE-BUTADIENE BLOCK COPOLYMERS

DESCRIPTION

The invention relates to block copolymers comprising at least two hard blocks $S_1$ and $S_2$ made from vinyl aromatic monomers and, between these, at least ore random soft block B/S made from vinyl aromatic monomers and from dienes, where the proportion of the hard blocks is above 40% by weight, based on the total block co-polymer.

The invention further relates to a process for preparing the block copolymers, and also to their use.

U.S. Pat. No. 4,939,208 describes linear, transparent styrene-butadiene block copolymers of the structure $S_1$—$B_1$—B/S—$S_2$. The polymerisation of styrene and butadiene in the presence of a Lewis base, in particular tetrahydrofuran (randomizer), gives the random copolymer block B/S. The length of the B/S segment depends on the amount of Lewis base.

EP-A 0 654 488 describes polymodal coupled styrene-butadiene block copolymers. The blocks B/S contain a styrene gradient (tapered block). By adding polar compounds, such as tetrahydrofuran, as randomizers, the random proportion in the blocks can be increased.

Polymerisation of styrene and butadiene in the presence of small amounts of tetrahydrofuran as randomizer gives a high proportion of homopolybutadiene blocks and a tapered transition to the polystyrene block. If the amount of tetrahydrofuran is increased, this gives butadiene-styrene copolymer blocks with some degree of random character it also sharply increases the relative proportion of 1,2 linkages in the polydiene (1,2-vinyl content). The high 1,2-vinyl content, however, impairs the thermal stability of the corresponding block copolymers and increases the glass transition temperature.

DE-A 19615533 describes an elastomeric styrene-butadiene block copolymer in which the relative proportion of 1,2 linkages in the polydiene is 15% and the proportion of the hard phase is from 1 to 40% by volume. The polymerization of the soft phase is undertaken in the presence of a soluble potassium salt.

Random copolymerisation of styrene and butadiene in cyclohexane in the presence of soluble potassium salts is described by S. D. Smith, A. Ashraf in Polymer Preprints 34 (2), 672 (1993) and 35 (2), 466 (1994). The soluble potassium salts mentioned comprise potassium 2,3-dimethyl-3-pentanolate and potassium 3-ethyl-3-pentanolate.

It is an object of the present invention to provide a glass-clear impact-modified polystyrene which has a balanced toughness/stiffness ratio and does not have the above-mentioned disadvantages. In particular, the impact-modified polystyrene should have high intrinsic thermal stability and reduced thixotropy. It should also be compatible with styrene polymers.

We have found this object is achieved by means of block copolymers comprising at least two hard blocks $S_1$ and $S_2$ made from vinyl aromatic monomers and, between these, at least one random soft block B/S made from vinyl aromatic monomers and from dienes, where the proportion of the hard blocks is above 40% by weight, based on the total block copolymer, when the 1,2-vinyl content in the soft block B/S is less than 20%.

For the purposes of the present invention, vinyl Content is the relative proportion of 1,2 linkages of the dime units based on the total of 1,2, 1,4-cis and 1,4-traps linkages. The 1,2-vinyl content of the soft blocks is preferably from 10 to 20%, in particular from 12 to 16%.

Vinyl aromatic monomers which may be used for the hard blocks $S_1$ and $S_2$ or else for the soft blocks B/S are styrene, a-methylstyrene, p-methylstyrene, ethylstyrene, tert-butylstyrene, vinyl toluene or mixtures of these, preferably styrene.

Preferred dienes for the soft block B/S are butadiene, isoprene, 2,3-dimethylbutadiene, 1,3-pentadiene, 1,3-hexadienes or piperylene or mixtures of these, particularly preferably 1,3-butadiene.

The block copolymer is preferably composed exclusively of hard blocks $S_1$ and $S_2$ and also of at least one random soft block B/S, and does not contain any homopolydiene blocks B. Preferred block copolymers contain external hard blocks $S_1$ and $S_2$ having different block lengths. The molar pass of $S_1$ is preferably from 5000 to 30000 g/mol, in particular from 10,000 to 20,000 g/mol. The molar mass of $S_2$ is preferably above 35,000 g/mol. Preferred molar masses of $S_2$ are from 5,000 to 15,000 g/mol.

Between the hard blocks $S_1$ and $S_1$ there may also be more than one random sot block B/S. Preference is given to at least 2 random soft blocks $(B/S)_1$ and $(B/S)_2$ having different proportions of vinyl aromatic monomers and therefore different glass transition temperatures. The block copolymers may have a linear or star-shaped structure.

The linear block copolymer used preferably has the structure $S_1$—$(B/S)_1$—$(B/S)_2$—$S_2$. The molar ratio of vinyl aromatic monomer to diene S/B in the block $(B/S)_1$ is preferably below 0.25 and in the block $(B/S)_2$ a preferably from 0.5 to 2.

The star-shaped block copolymers used preferably have a structure in which at least one arm of the star has a block sequence $S_1$—(B/S) and one arm of the star has the block sequence $S_2$—(B/S), or those in which at least ore arm of the star has the block sequence $S_1$—(B/S)—$S_3$ and at least one arm of the star has the block sequence $S_2$—(B/S)—$S_3$. $S_3$ here is another hard block made from the vinyl aromatic monomers mentioned.

Most preferred for star-shaped block copolymers are structures in which at least one arm of the star has a block sequence $S_1$—$(B/S)_1$—$(B/S)_2$ and at least one arm of the star has the block sequence $S_2$—$(B/S)_1$—$(B/S)_2$ or those in which at least one arm of the star has the black sequence $S_1$—$(B/S)_1$—$(B/S)_2$—$S_3$ and at least one arm of the star has the block sequence $S_2$—$(B/S)_1$—$(B/S)_2$—$S_3$. The molar ratio of vinyl aromatic monomer to diene S/B in the block $(B/S)_1$ is preferably from 0.5 to 2 and in the block $(B/S)_2$ is preferably below 0.5.

The novel black copolymers may, for example, be formed by sequential anionic polymerisation, where as least the polymerisation of the blocks (B/S) takes place in the presence of a potassium salt. The potassium salt is generally used in a molar deficiency, based on the anionic polymerisation initiator. The molar ratio selected of anionic polymerisation initiator to potassium salt is preferably from 10:1 to 100:1, particular preferably from 30:1 to 70:1. The potassium salt used should generally be soluble in the reaction medium. Examples of suitable potassium salts are potassium alcoholates, in particular a potassium alcoholate of a tertiary alcohol having at least 7 carbon atoms. Particular preference is given to use of potassium 2-methylbutanolate, potassium 2,3-dimethyl-3-pentanolate, potassium 2-methylhexanolate, potassium 3,7-dimethyl-3-octanolate (potassium tetrahydrolinaloolate) or potassium 3-ethyl-3-pentanolate.

The potassium alcoholates are obtainable, for example, by reacting elemental potassium, potassium/sodium alloy or potassium alkylates with the appropriate alcohols in an inert solvent.

It is useful for the potassium salt not to be added to the reaction mixture until the anionic polymerisation initiator has been added. In this way hydrolysis of the potassium salt by traces of aprotic contaminants can be avoided. The potassium salt is particularly preferably added just prior to polymerisation of the random soft block B/S.

Anionic polymerisation initiators which may be used are the usual mono- bi- or multifunctional alkali petal alkyl compounds, alkali metal aryl compounds or alkali metal aralkyl compounds. It is advantageous to use organolithium compounds, such as ethyl-, propyl-, isopropyl-, n-butyl-, sec-butyl-, tert-butyl-, phenyl-, diphenylhexyl-, hexamethyldi-, butadienyl-, isopropyl- or polystyryllithium, 1,4-dilithiobutane 1,4-dilithio-2-butene or 1,4-dilithiobenzene. The amount of polymerisation initiator needed depends on the desired molar weight. It is generally from 0.001 to 5 mol %, based on the total amount of monomers.

The polymerisation may be undertaken in the presence of a solvent. Suitable solvents are those aliphatic, cycloaliphatic or aromatic hydrocarbons which have from 4 to 12 carbon atoms and are usual for anionic polymerisation, such as pentane, hexane, heptane, cyclohexane, methylcyclohexane, iso-octane, benzene, alkylbenzenes, such as toluene, xylene or ethylbenzene, or decalin or appropriate mixtures. Preference is given to cyclohexane and methylcyclohexane.

The polymerisation may also be carried out without solvent in the presence of organyl metal compounds which slow down the rate of polymerisation, such as alkylmagnesium compounds, alkylaluminum compounds or alkyl zinc compounds.

Once the polymerisation has ended the living polymer chains may be capped using a chain terminator. Suitable chain terminators are protonating substances or Lewis acids, such as water, alcohols, aliphatic or aromatic carboxylic acids, or also inorganic acids, such as carbonic acid or boric acid.

Instead of adding a chain terminator once the polymerisation has ended, the living polymer chains may also be linked to give a star shave by polyfunctional capping agents, such as polyfunctional aldehydes, ketones, esters, anhydrides or epoxides. Symmetrical or asymmetrical star block copolymers whose arms may have the abovementioned block structures may be obtained here by coupling identical or different blocks. Asymmetrical star block copolymers are obtainable, for example, by preparing the individual arms of the star separately and/or by initiating more than once, for example initiating twice with the initiator divided in a ratio of from 2/1 to 10/1.

The novel block copolymers behave as glass-clear impact-modified polystyrene with a balanced toughness/stiffness ratio. The random soft block B/S with a low 1,2-vinyl content gives the novel black copolymers high intrinsic thermal stability.

The novel block copolymers also have good compatibility with other styrene polymers, and may therefore be processed to give polymer mixtures. The novel block copolymers or polymer mixtures may be used for producing fibers, forms of moldings.

EXAMPLES

Test methods

The melt volume rate MVR (200° C./5 kg) was determined to ISO 1133.

Specimens for mechanical testing were injection-molded at 220° C. melt temperature and 45° C. mold temperature. The modulus of elasticity, yield stress, breaking stress, elongation at yield point and elongation at break were determined from a tensile test ISO 527 with tensile specimens to ISO 3167.

The Vicat softening points VST/A and VST/B were determined to the DIN ISO 306 test specification.

The molecular weights were determined using gel permeation chromatography (GPC) on polystyrene gel columns of Polymer Labs. mixed B type with monodisperse polystyrene standards at room temperature using tetrahydrofuran as eluent.

The 1,2-vinyl content was determined by FT-IR-spectroscopy.

Examples 1 to 5

Linear styrene-butadiene block copolymers of the structure $S_1$—$(B/S)_1$—$(B/S)_2$—$S_2$ were obtained by sequential anionic polymerisation of styrene and butadiene in cyclohexane as solvent at from 60 to 90° C. For this, 598 l of cyclohexane and 1,235 l of a 1.5 molar sec-butyllithium solution (n-hexane/cyclohexane) were the initial charge in a 1500 l stirred reactor and the amount of styrene required to prepare the block $S_1$ was metered in. After all of the styrene had been consumed, potassium tetrahydrolinalooate was added as randomizer and blocks $(B/S)_1$ and $(B/S)_2$ were attached by adding the mixtures made from styrene and butadiene and as seen in Table 1. Finally the styrene block $S_2$ was polymerised and terminated using isopropanol. The block copolymers had a molar mass $M_n$ of 120,000 g/mol. The molar ratios of initiator/randomizer (Li/K) and the proportions of styrene and butadiene in the respective blocks based on the entire polymer are given in Table 1. For examples 1 to 4 a total of 156 kg of styrene and 44 kg of butadiene were used and for Example 5 152 kg of styrene and 48 kg of butadiene were used.

TABLE 1

Block structure (proportions in % by weight) and randomizer proportion (molar ratio of Li/K) for the linear styrene-butadiene block copolymers

| Block Ex. | $S_1$ Styrene | $(B/S)_1$ Butadiene | $(B/S)_1$ Styrene | $(B/S)_2$ Butadiene | $(B/S)_2$ Styrene | $S_2$ Styrene | Li/K | 1,2-vinyl [%] |
|---|---|---|---|---|---|---|---|---|
| 1 | 18.0 | 14.7 | 8.3 | 7.3 | 15.7 | 36 | 60/1 | 16.2 |
| 2 | 18.0 | 14.7 | 8.3 | 7.3 | 15.7 | 36 | 80/1 | 14.5 |
| 3 | 18.0 | 14.7 | 8.3 | 7.3 | 15.7 | 36 | 40/1 | 17.9 |

TABLE 1-continued

Block structure (proportions in % by weight) and randomizer proportion (molar ratio of Li/K) for the linear styrene-butadiene block copolymers

| Block Ex. | $S_1$ Styrene | $(B/S)_1$ Butadiene | $(B/S)_1$ Styrene | $(B/S)_2$ Butadiene | $(B/S)_2$ Styrene | $S_2$ Styrene | Li/K | 1,2-vinyl [%] |
|---|---|---|---|---|---|---|---|---|
| 4 | 9.0 | 14.7 | 8.3 | 7.3 | 15.7 | 45 | 60/1 | 15.2 |
| 5 | 9.0 | 14.7 | 8.3 | 9.3 | 13.7 | 45 | 60/1 | 15.8 |

TABLE 2

Mechanical data (test specimens stamped out from pressed sheet) for the linear styrene-butadiene block copolymers from Examples 1 to 5

| Example | Modulus of elasticity [MPa] | Yield stress [MPa] | Breaking stress [MPa] | Elongation at break [%] | Shore-hardness D [°] | Vicat B softening point [° C.] |
|---|---|---|---|---|---|---|
| 1 | 500 | 12.9 | 33.3 | 350 | 61 | 43.3 |
| 2 | 733 | 16.7 | 27.7 | 298 | 64 | 44.6 |
| 3 | 380 | 12.0 | 26.2 | 365 | 66 | 43.6 |
| 4 | 753 | 18.2 | 30.7 | 341 | 63 | 42.8 |
| 5 | 424 | 13.8 | 33.6 | 373 | 60 | 39.9 |

TABLE 3

Amounts of starting materials added for Examples 6 to 8

| | Block | Example 6 | Example 7 | Example 8 |
|---|---|---|---|---|
| Cyclohexane | | 3733 g | 3733 g | 3733 g |
| sec-BuLi I (1.55 m) | | 5.1 ml | 5.1 ml | 4.66 ml |
| Styrene I | $S_a$ | 635.2 g | 635.2 g | 616.3 g |
| sec-BuLi II (1.55 m) | $S_b$ | 17.93 ml | 17.93 ml | 16.37 ml |
| Styrene II | $S_b$ | 420.8 g | 420.8 g | 371.4 g |
| K THL (0.358 m in cyclohexane) | | 5.42 ml | 5.42 ml | 4.97 ml |
| Butadiene | B/S | 362.7 g | 272 g | 273.9 g |
| Styrene III | B/S | 181.3 g | 272 g | 137 g |
| Styrene IV | $S_c$ | | | 205.3 g |
| Edenol | | 5.58 ml | 5.58 ml | 5.10 ml |

Examples 6 to 8

Star-shaped styrene butadiene block copolymers of structures I and II were obtained by sequential anionic polymerisation of styrene and butadiene in cyclohexane as solvent at from 60 to 90° C. followed by coupling using epoxidized linseed oil (Edenol B 316 from Henkel).

Structure I:

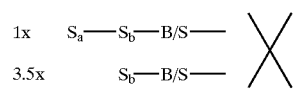

Structure II:

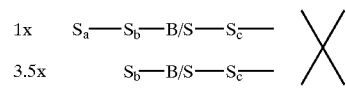

The block termed $S_1$ in the Description corresponds to $S_b$, $S_2$ is formed from $S_a$—$S_b$ and $S_3$ corresponds to $S_c$.

The process was carried out using as initial charge of sec-butyllithium and cyclohexane titrated to the end point with sec-butyllithium in a 10 l stirred reactor and metering in the amount of styrene (styrene I) needed to prepare the block $S_a$. This was followed by another initiation using sec-butyllithium (sec-BuLi II) and metering in the appropriate amount of styrene (styrene II) for the block $S_b$. After all of the styrene had been consumed, potassium tetrahydrolinoloolate (Li:K=20:1) was added as randomizer and the blocks (B/S) were attached by adding a mixture of styrene (styrene III) and butadiene. In the case of structure II another styrene block $S_c$ (styrene IV) was polymerised on. The resultant block copolymers were then coupled using Edenol B 316. The amounts of the starting materials used are given in Table 3 and the make-ups of the blocks and physical and mechanical properties of the block copolymers are given in Table 4.

TABLE 4

Physical and mechanical properties of the star-shaped styrene-butadiene block copolymers

| | Example | | |
|---|---|---|---|
| | 6 | 7 | 8 |
| Structure | I | I | II |
| $M(S_a)$ | 80000 | 80000 | 87600 |
| $M(S_b)$ | 11852 | 11777 | 11740 |
| $M(B/S)$ | 12698 | 15225 | 13000 |
| $M(S_c)$ | — | — | 6490 |
| Weight ratio of styrene to butadiene in the block (B/S) | 1:2 | 1:1 | 1:2 |
| Proportion of butadiene in % by weight based on entire polymer | 20 | 17 | 17.1 |
| Proportion of soft block (B/S) in % by weight based on entire polymer | 30 | 34 | 25.65 |
| 1,2-vinyl content (%) FTIR | 15.9 | 19.5 | 7.2 |
| Tg (° C., DSC) | −54 | −22 | −66 |
| MVR (200° C./5 kg) | 9.7 | 11.2 | 5.3 |
| Vicat A softening (° C.) | 83.0 | 79.6 | 83.5 |
| Shore hardness A/D (° C.) | | | 96.9/71.6 |
| Modulus of elasticity (MPa) | 399 | 729 | 1294 |
| Yield stress (MPa) | 15.8 | 22.3 | 25.6 |
| Breaking stress (MPa) | 27.2 | 33.1 | 23.2 |
| Elongation at break (%) | 304 | 300 | 297 |

Example 9

Linear styrene-butadiene block copolymers of the structure S—$(B/S)_1$—$(B/S)_2$—$S_2$ were obtained by sequential anionic polymerisation of styrene and butadien as described in examples 1 to 5, however, potassium tert.-acrylate (KTA) was used as randomizer instead of potassium tetrahydrolinaloolate. The molar ratio of lithium/potassium was 38:1.

A mixture of 4786 ml cyclohexane and 1 ml 1,1-diphenylethene were the initial charge and had been titrated at 50° C. with a 1,4 molar sec-butyllithium solution until a light red color appeared. The below listed raw materials were added in 4 steps. After each addition the polymerization was carried out at 65° C. until all monomers had been consumed. Finally the reaction mixture was terminated using 1.70 ml isopropanol and acidified using 7.30 ml formic acid. 64 g Irganox 3052 and 102 g Trisnonylphosphite (TNPP) was added for stabilization.

The thus obtained blockcopolymer was degassed using a twin screw extruder ZSK 25.

Charge 1

211 ml (192 g) styrene 10.4 ml sec-butyllithium (1.4 molar solution in cyclohexan/n-hexane 90/10)

potassium tertiäramylate (KTA) 1.07 ml (0.338 molar in Cyclohexan)

Charge 2

Simultaneous addition of 335 ml butadiene (219 g) and 146 ml styrene (133 g)

Charge 3

Simultaneous addition of 276 ml butadiene (181 g) and 276 ml styrene (251 g)

Charge 4

Addition of 686 ml (624 g) styrene

Example 10

Example 9 was repeated with 0.968 ml KTA as randomizer. (Li:K=42:1)

Example 11

Example 9 was repeated with 3.62 ml of a 0.1 molar solution of potassium tetrahydrolinaloolate in cyclohexane.

TABLE 5

Analytical and mechanical data on injection-molded specimen of the examples 9 to 11:

|  | Example 9 | Example 10 | Example 11 |
|---|---|---|---|
| 1,2-vinyl content [%]: | 15,1 | 13,7 | 12,7 |
| DSC: glass transition temperature [° C.] | −55/+90 | −55/+90 | −55/+90 |
| modulus of elastity [MPa] | 1175 | 1374 | 1170 |

TABLE 5-continued

Analytical and mechanical data on injection-molded specimen of the examples 9 to 11:

|  | Example 9 | Example 10 | Example 11 |
|---|---|---|---|
| yield stress [MPa] | 18,4 | 21,9 | 18,2 |
| elongation at break [%] | 284 | 288 | 290 |
| Vicat ST B [° C.] | 36,7 | 40,7 | 36,5 |

Examples 12 to 19

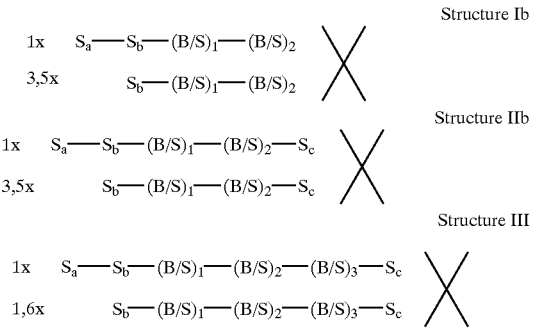

The block termed $S_1$ in the description corresponds to $S_b$, $S_2$ is formed from $S_a$ and $S_b$, and $S_3$ corresponds to $S_c$.

Star-shaped styrene-butadiene block copolymers of structure I, Ib, IIb and III were obtained by sequential anionic polymerization of styrene and butadiene as described in examples 6 to 8 with the charges of table 6. The resulting block copolymers were then coupled using Edenol B316 (tetrafunctional) or diethylcarbonate (trifunctional). Physical and mechanical properties are listed in table 7.

Examples 20 to 27

The block copolymers of examples 12 to 20 were blended with general purpose polystyrene (grade PS 158 K from BASF) in the ratio 30/70 by weight.

TABLE 6

Amounts of starting materials added for Examples 12 to 19

|  | Block | Unit | 12 | 13 | 14 | 15 | 16 | 17 | 18 | 19 |
|---|---|---|---|---|---|---|---|---|---|---|
| Cyclohexane |  | l | 643 | 643 | 643 | 643 | 643 | 643 | 643 | 643 |
| Styrene I | $S_a$ | kg | 76.2 | 76.2 | 76.2 | 57.2 | 45.8 | 76.2 | 54.2 | 54.2 |
| sec-Buli I 1.35 m |  | l | 0.788 | 0.788 | 0.788 | 0.788 | 0.788 | 1.050 | 0.900 | 0.900 |
| K-THL (3%) |  | l | 1.057 | 1.057 | 1.057 | 1.057 | 1.057 | 1.096 | 0.698 | 0.442 |
| sec-Buli II 1.35 m |  | l | 2.757 | 2.757 | 2.757 | 2.757 | 2.757 | 2.625 | 1.440 | 1.440 |
| Styrene II | $S_b$ | kg | 46.3 | 32.4 | 32.4 | 51.4 | 62.9 | 32.4 | 40.4 | 40.4 |
| Butadiene I | $(B/S)_1$ | kg | 52.0 | 10.0 | 10 | 10 | 10 | 10 | 18.0 | 18.0 |
| Styrene III | $(B/S)_1$ | kg | 25.4 | 13.9 | 13.9 | 13.9 | 13.9 | 13.9 | 17.1 | 17.1 |
| Butadiene II | $(B/S)_2$ | kg |  | 42.0 | 42.0 | 42.0 | 42.0 | 42.0 | 18.0 | 18.0 |
| Styrene IV | $(B/S)_2$ | kg |  | 25.4 | 20.3 | 20.3 | 20.3 | 20.3 | 17.1 | 17.1 |
| Butadiene III | $(B/S)_3$ | kg |  |  |  |  |  |  | 18.0 | 18.0 |
| Styrene V | $(B/S)_3$ or $S_c$ | kg |  |  | 5.1 | 5.1 | 5.1 | 5.1 | 10.8 | 10.8 |
| Styrene VI | $S_c$ | kg |  |  |  |  |  |  | 6.4 | 6.4 |
| Edenol B316 |  | ml |  | 531 | 531 | 531 | 531 | 551 |  |  |

TABLE 6-continued

Amounts of starting materials added for Examples 12 to 19

|  | Block | Unit | 12 | 13 | 14 | 15 | 16 | 17 | 18 | 19 |
|---|---|---|---|---|---|---|---|---|---|---|
| Diethylcarbonate | | ml | | | | | | | 128 | 128 |
| Structure | | | I | Ib | IIb | IIb | IIb | IIb | III | III |

TABLE 7

Physical and mechanical properties of star-shaped styrene-butadiene blockcopolymers of Examples 12 to 19

| Ex. | Vicat B [° C.] | Shore-hardness D [° C.] | Modulus of elasticity [MPa] | Yield stress [MPa] | elongation of break [%] |
|---|---|---|---|---|---|
| 12 | 36,2 | 57 | 255 | 12,5 | 368 |
| 13 | 31,6 | 53 | 208 | 9,2 | 360 |
| 14 | 31,8 | 55 | 343 | 10,7 | 360 |
| 15 | 35,6 | 57 | 231 | 9,4 | 437 |
| 16 | 37,8 | 60 | 395 | 12,3 | 445 |
| 17 | 32,9 | 55 | 180 | 9,8 | 399 |
| 18 | 32,1 | 53 | 114 | 7,0 | 494 |
| 19 | 33,2 | 53 | 117 | 7,0 | 496 |

TABLE 8

Physical and mechanical properties of blends of Examples 12 to 19 with GPPS

| Ex. | block-copolymer of Example | Vicat B [° C.] | Shore-hardness D [° C.] | Modulus of elasticity [MPa] | Yield stress [MPa] | elongation of break [%] |
|---|---|---|---|---|---|---|
| 20 | 12 | 76,3 | 75 | 1183 | 33,7 | 9,9 |
| 21 | 13 | 71,4 | 80 | 1236 | 34,2 | 11 |
| 22 | 14 | 63,7 | 79 | 1421 | 31,9 | 2,6 |
| 23 | 15 | 80,4 | 77 | 1169 | 28,5 | 49 |
| 24 | 16 | 86,9 | 77 | 1830 | 37,3 | 17 |
| 25 | 17 | 79,9 | 77 | 855 | 31,7 | 35 |
| 26 | 18 | 76,1 | 75 | 1467 | 27,6 | 49 |
| 27 | 19 | 78,7 | 74 | 1044 | 27,9 | 63 |

We claim:

1. A block copolymer comprising at least two hard block $S_1$ and $S_2$ made from vinylaromatic monomers and, between these, at least one random soft block B/S made from vinylaromatic monomers and dienes, where the proportion of the hard blocks is from 51% to 74% by weight based on the total block copolymer wherein the 1,2-vinyl content in the soft block B/S is less than 20%, in which block copolymer there is no homopolymer block B made from dienes.

2. The block copolymer of claim 1, wherein there are at least two random soft blocks (B/S)$_1$ and (B/S)$_2$ having different relative proportions of vinyl aromatic monomers between the hard blocks $S_1$ and $S_2$.

3. A block copolymer as claimed in claim 2, which has a linear structure $S_1$—(B/S)$_1$—(B/S)$_2$—$S_2$, where the molar ratio of vinyl aromatic monomer to diene S/B in the block (B/S)$_1$ is below 0.25 and in the block (B/s)$_2$ is from 0.5 to 2.

4. A block copolymer as claimed in claim 2, which has a star-shaped structure having at least one arm of the star with the block sequence $S_1$—(B/S)$_1$—(B/S)$_2$ and one arm of the star with the block sequence $S_2$ —(B/S)$_1$—(B/S)$_2$, wherein the molar ratio of vinyl aromatic monomer to diene S/B in the block (B/S)$_1$ is from 0.5 to 2 and in the block (B/S)$_2$ is below 0.5.

5. A block copolymer as claimed in claim 2, which has a star-shaped structure having at least one arm of the star with the block sequence $S_1$—(B/S)$_1$—(B/S)$_2$—$S_3$ and one arm of the star with the block sequence $S_2$—(B/S)$_1$—(B/S)$_2$—$S_3$, wherein the molar ratio of vinyl aromatic monomer to diene S/B in the block (B/S)$_1$ is from 0.5 to 2 and in the block (B/S)$_2$ is below 0.5, and wherein $S_3$ is another hard block made from vinyl aromatic monomers.

6. The block copolymer of claim 1, wherein the molar mass of $S_1$ is from 5,000 to 30,000 g/mol. and the molar mass of $S_2$ is above 35,000 g/mol.

7. A block copolymer as claimed in claim 1 which has a star-shaped structure having at least one arm of the star with the block sequence $S_1$—(B/S) and one arm of the star with the black sequence $S_2$—(B/S).

8. A block copolymer as claimed in claim 1, which has a star shaped structure where at least one arm of the star has the block sequence $S_1$—(B/S)—$S_3$, and at least on arm of the star has the block sequence $S_2$—(B/S)—$S_3$, where $S_3$ is another hard block made from vinyl aromatic monomers.

9. A polymer mixture made from block copolymers as claimed in claim 1 and from other styrene polymers.

10. A process for preparing block copolymers as claimed in claim 1, which comprises forming the block copolymers by sequential anionic polymerization, where at least the polymerization of the soft block (B/S) take place in the presence of a potassium salt.

11. A process for preparing block copolymers as claimed in claim 10, wherein the molar ratio of anionic polymerisation initiator to potassium salt is from 10:1 to 100:1.

12. A process for preparing block copolymers as claimed in claim 10, wherein the potassium salt used comprises a potassium alcoholate of a tertiary alcohol having at least 7 carbon atoms.

13. A process for preparing block copolymers as claimed in claim 10, wherein the potassium salt used comprises potassium-2-methyl-butanolate, potassium 2,3-dimethyl-3-pentanolate, potassium 3,7-dimethyl-3-octanolate, or potassium 3-ethyl-3-pentanolate.

* * * * *

UNITED STATES PATENT AND TRADEMARK OFFICE
CERTIFICATE OF CORRECTION

PATENT NO.    : 6,521,712 B1
DATED         : February 18, 2003
INVENTOR(S)   : Knoll et al.

It is certified that error appears in the above-identified patent and that said Letters Patent is hereby corrected as shown below:

Column 9,
Line 54, "(B/S," should be -- $(B/S)_1$ --.
Line 60, "$(B/s)_2$" should be -- $(B/S)_2$ --.

Column 10,
Line 37, "on arm" should be -- one arm --.
Line 48, "polymerisa-" should be -- polymeriza- --.

Signed and Sealed this

Eighth Day of April, 2003

JAMES E. ROGAN
*Director of the United States Patent and Trademark Office*